United States Patent
Breault

(10) Patent No.: US 8,029,753 B2
(45) Date of Patent: Oct. 4, 2011

(54) AMMONIA CONTACT SCRUBBER SYSTEM FOR A FUEL CELL

(76) Inventor: Richard D Breault, North Kingston, RI (US)

( * ) Notice: Subject to any disclaimer, the term of this patent is extended or adjusted under 35 U.S.C. 154(b) by 31 days.

(21) Appl. No.: 12/448,380

(22) PCT Filed: Dec. 20, 2006

(86) PCT No.: PCT/US2006/048701
§ 371 (c)(1),
(2), (4) Date: Jun. 18, 2009

(87) PCT Pub. No.: WO2008/079113
PCT Pub. Date: Jul. 3, 2008

(65) Prior Publication Data
US 2010/0024648 A1    Feb. 4, 2010

(51) Int. Cl.
*B01D 53/14* (2006.01)
(52) U.S. Cl. .............. 423/238; 95/197; 95/211; 95/232; 96/234; 96/244; 96/290
(58) Field of Classification Search ............ 95/232, 95/211, 197; 96/234, 236, 290, 244
See application file for complete search history.

(56) References Cited

U.S. PATENT DOCUMENTS

| | | | |
|---|---|---|---|
| 4,259,302 A | 3/1981 | Katz et al. | |
| 5,792,572 A | 8/1998 | Foley et al. | |
| 6,376,114 B1 * | 4/2002 | Bonville, Jr. et al. | 429/425 |
| 2009/0246573 A1 * | 10/2009 | Grasso et al. | 429/17 |

* cited by examiner

*Primary Examiner* — Duane Smith
*Assistant Examiner* — Tiffany N Palmer
(74) *Attorney, Agent, or Firm* — Malcolm J. Chisholm, Jr.

(57) ABSTRACT

An ammonia contact scrubber system (10) for removing ammonia from a fuel stream for a fuel cell (16) includes a contact scrubber (12) having a scrubber fuel inlet (14) and a scrubber fuel exhaust (20) for directing flow of the fuel stream through support material (24) within the scrubber (12) and into the fuel cell (16). An acid circulating loop (26) has an acid holding tank (28) holding a liquid acid solution (30), an acid feed line (32) secured in fluid communication between the holding tank (28) and a scrubber acid inlet (36) of the contact scrubber (12), an acid return (38) for returning the acid solution from the scrubber (12) to the acid holding tank (28), and an acid circulation pump (42) for pumping the acid solution (30) through the acid circulating loop (26) and through the support material (24) within the scrubber (12).

9 Claims, 1 Drawing Sheet

AMMONIA CONTACT SCRUBBER SYSTEM FOR A FUEL CELL

TECHNICAL FIELD

The present disclosure relates to fuel cells that are suited for usage in transportation vehicles, portable power plants, or as stationary power plants, and the disclosure especially relates to a system for removing ammonia from a fuel stream flowing into a fuel cell.

BACKGROUND ART

Fuel cells are well known and are commonly used to produce electrical current from hydrogen containing reducing fluid fuel and oxygen containing oxidant reactant streams to produce electrical power. In fuel cells of the prior art, it is well known that fuel is often produced by a reformer and the resulting hydrogen rich fuel flows from the reformer through a fuel inlet line into an anode flow field of the fuel cell. As is well known an oxygen rich reactant simultaneously flows through a cathode flow field of the fuel cell to produce electricity. Unfortunately, known fuels for fuel cells, such as reformate fuels from reformers, frequently contain contaminants especially ammonia. The presence of ammonia in the fuel stream is detrimental to the performance of the fuel cell.

It is understood that ammonia is a common byproduct of the reforming process and although the reforming process is designed to minimize formation of ammonia, it is common that low levels of ammonia are present in the reformate fuel. Nitrogen present in a hydrogen rich fuel reacts with hydrogen in common steam reformers, which typically utilize conventional nickel catalysts, to form ammonia in a concentration range of parts per million. The ammonia causes performance degradation of the fuel cell when introduced to either a proton exchange membrane fuel cell ("PEMFC") or a phosphoric acid fuel cell ("PAFC"). Fuel specifications for a known PAFC power plant require a maximum allowable nitrogen concentration in the natural gas of 4% to prevent degradation of the fuel cell due to ammonia formation. This fuel specification places a serious limitation on the use of fuel cells in areas of the world where natural gas includes a nitrogen content in excess of the fuel specification. Additionally, in the case of auto thermal or partial oxidation reformers, nitrogen can also be introduced when air is used as the oxygen source for the reforming process.

Many efforts have been undertaken to remove ammonia and other contaminants from fuel streams of fuel cells. For example, U.S. Pat. No. 4,259,302 to Katz et al. discloses use of a regenerable scrubber for removing ammonia from a fuel cell fuel stream. Ammonia gas is scrubbed from the fuel stream in a bed of support material soaked with acid. In Katz et al., the preferred acid is phosphoric acid and the preferred support material is carbon in the form of porous carbon particles or pellets. As disclosed in Katz, when an ammonia contaminant passes through a scrubber having phosphoric acid, the ammonia is absorbed on the support material and reacts with the phosphoric acid as follows:

$H_3PO_4 + NH_3 \rightarrow (NH_4)H_2PO_4$ (Equation 1)

As is apparent, in removing the ammonia contaminant, the phosphoric acid is converted to ammonium dyhydrogen phosphate. When approximately 50 percent of the phosphoric is converted, there is a risk of breakthrough of the ammonia out of the scrubber and into the fuel stream passing into the fuel cell. Consequently, the capacity for removal of ammonia by known scrubbers is determined by an anticipated level of ammonia in the fuel stream and the operational duration of the fuel cell prior to service or replacement of the scrubber.

For example, U.S. Pat. No. 5,792,572 to Foley et al. shows another effort at minimizing ammonia contamination wherein a scrubber contains phosphoric acid absorbed onto porous carbon pellets. The scrubber of Foley et al. is utilized to both remove ammonia from the fuel stream and also to add acid to the fuel cell in a controlled manner. However, because of the described conversion of phosphoric acid within the scrubber, in the Foley et al. system, a scrubber capable of providing acceptable ammonia removal for five to ten years without replacement must be unacceptably large, bulky and excessively costly.

More recently U.S. Pat. No. 6,376,114, that issued on Apr. 23, 2002 to Bonville, Jr. et al., discloses another elaborate system for removing ammonia and other contaminants from reformate fuel. The system of Bonville, Jr. et al., includes alternatively a disposable ammonia scrubber, an ammonia scrubbing cool water bed and an ammonia stripping warm water bed, a pair of first and second regenerable scrubbers, or a single regenerable scrubber. Again, while effective the Bonville, Jr. et al. system includes elaborate and costly components that require a high level of maintenance to operate the system. The aforesaid three patents are owned by the assignee of all rights in the present disclosure.

For known scrubbers that include acid absorbed on a support material, a standard volume efficiency is between 0.10 to 0.30 units of volume of acid per unit of internal volume of the scrubber depending upon a particular carbon and shape of the carbon. Granular materials have higher packing efficiencies at an expense of a lower pressure drop. In contrast, cylindrical materials have a lower pressure drop at an expense of lower packing efficiencies. As described above breakthrough of the ammonia out of the scrubber and into the fuel stream typically occurs after only 50 percent of the conversion of the acid because of concentration gradients within the particular support material utilized within the scrubber. Passing of the gaseous fuel stream through the support material causes disproportionate contact with acid adjacent fuel stream passages within the support material. Acid concentrated within the support material and away from such fuel stream passages may experience little or no contact with the fuel stream. Therefore, to operate efficiently known scrubbers require a high volume of acid per unit of internal volume of the support material, and a corresponding high volume of support material in a large scrubber.

Other ammonia and related contaminant removal systems for fuel cells are known in the art. However, none of these provide for efficiently removing ammonia with minimal costs and minimal maintenance requirements. Most known ammonia contaminant removal systems require large components for processing a high volume of fluids, or require high frequency removal and replacement of expensive, contaminated filters and/or ion beds, etc.

Consequently, there is a need for a ammonia removal system for a fuel stream of a fuel cell that significantly reduces overall system size and that may be operated efficiently for long periods of time without high frequency maintenance.

SUMMARY

The disclosure is an ammonia contact scrubber system for removing ammonia from a fuel stream for a fuel cell. The system includes a contact scrubber including a scrubber fuel inlet configured to receive a hydrogen rich fuel for a fuel cell, a scrubber fuel exhaust configured to direct flow of the hydrogen rich fuel from the scrubber into the fuel cell. The contact scrubber houses a support material and is configured to direct flow of the fuel from the fuel inlet through the support material to the fuel exhaust. The system also includes an acid circulating loop having an acid holding tank that is configured to hold a liquid acid solution. An acid feed line is secured in fluid communication between a tank acid outlet of the holding tank and a scrubber acid inlet of the contact scrubber. An acid return is also secured in fluid communication between a scrubber acid outlet of the contact scrubber and the acid holding tank. The acid circulating loop also includes an acid circulation pump secured in fluid communication with the acid feed line and the pump is configured to pump the acid solution through the acid circulating loop.

In a preferred embodiment of the present disclosure, the acid circulating loop is configured to direct flow of the liquid acid solution through the support material within the contact scrubber in a first direction between the scrubber acid inlet and acid return. The contact scrubber is also configured to direct flow of the hydrogen rich fuel through the support material in a second direction between the scrubber fuel inlet and the scrubber fuel exhaust, wherein the first direction is opposed to the second direction to achieve counter-flow of the acid solution and fuel stream.

By circulating the acid solution through the contact scrubber while fuel is simultaneously flowing through the scrubber, the present disclosure achieves substantially enhanced removal of ammonia from the fuel stream per unit volume of the acid solution. Therefore, a much lower scrubber internal volume and lower overall volume of the acid is required to achieve the same level of ammonia removal that is achieved by up to ten times the volume of acid in larger, known scrubbers. Consequently, scrubbers and the acid holding tank may be efficiently sized based upon known ammonia concentrations of the particular fuel that is to supply the fuel cell, and/or upon specific service intervals for replacement of the acid solution within the acid circulating loop.

In an additional embodiment of the disclosure, the acid circulating loop may also include a sensor for monitoring the conversion of the acid by ammonia removal so that the acid solution may be replaced or enhanced before breakthrough of ammonia out of the scrubber and into the fuel stream entering the fuel cell.

Accordingly, it is a general purpose of the present disclosure to provide an ammonia contact scrubber system for a fuel cell that overcomes deficiencies of the prior art.

It is a more specific purpose to provide an ammonia contact scrubber system for a fuel cell that enhances removal of ammonia from a fuel stream for a fuel cell while also reducing size, maintenance requirements and operating costs of components of the system.

These and other purposes and advantages of the present ammonia contact scrubber system for a fuel cell will become more readily apparent when the following description is read in conjunction with the accompanying drawing.

DESCRIPTION OF THE PREFERRED EMBODIMENTS

Figure 1:
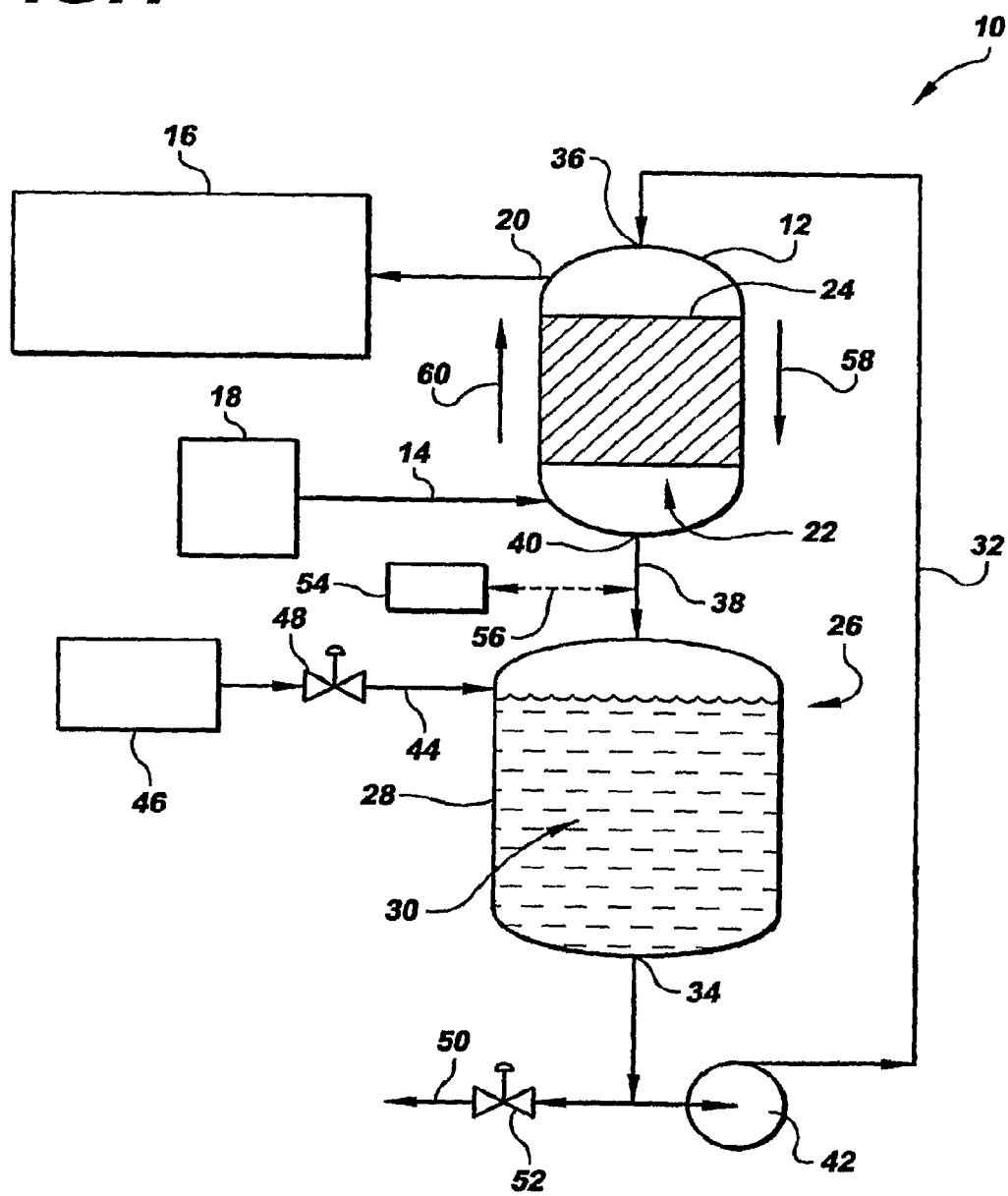
FIG. 1 is a simplified schematic representation of an ammonia contact scrubber system for a fuel cell constructed in accordance with the present disclosure.

Referring to the drawings in detail, an ammonia contact scrubber system for a fuel cell is shown in FIG. 1, and is generally designated by the reference numeral 10. The system 10 includes a contact scrubber 12 having a scrubber fuel inlet 14 configured to receive a hydrogen rich fuel for a fuel cell 16 from a fuel source 18, such as reformer means for producing a reformate fuel. The contact scrubber 12 also has a scrubber fuel exhaust 20 configured to direct flow of the hydrogen rich fuel from the scrubber 12 to the fuel cell 16. The contact scrubber 12 defines an internal volume 22 that houses a support material 24, and the scrubber 12 is configured to direct flow of the hydrogen rich fuel from the scrubber inlet 14 through the support material 24 to the scrubber fuel exhaust 20. The support material 24 may include any tower packings known in the art such as raschig rings, berl saddles or advanced forms of these devices that are designed to maximize the contact area between a liquid and a gas to maximize a rate of mass transfer. These tower packings must be resistant to corrosion by phosphoric acid. Suitable materials are carbon, ceramics such as silicon carbide, and plastics such as fluoropolymers. Typical packings may be acquired from the "Metaullics Systems Co. L.P." company of Sanborn, N.Y., U.S.A.; the "Koch-Glitsch" company of Wichita, Kans., U.S.A; "The Pall Ring Co." company of Denver, Colo., U.S.A.; and, "Rauschert Process Technologies, Inc." company of Knoxville, Tenn., U.S.A.

The ammonia contact scrubber system 12 also includes an acid circulating loop 26 having an acid holding tank 28 configured to contain a liquid acid solution 30. An acid feed line 32 is secured in fluid communication between an acid holding tank outlet 34 of the holding tank 28 and scrubber acid inlet 36 of the contact scrubber 12. An acid return 38 is also part of the loop 26 and is secured in fluid communication between a scrubber acid outlet 40 of the contact scrubber 12 and the acid holding tank 28. The acid circulating loop 26 also includes an acid circulating means for pumping the acid solution 30 through the acid circulating loop 26, such as an acid circulation pump 42 secured in fluid communication with the acid feed line 32. The acid circulating loop 26 may also include an acid fill line 44 secured in fluid communication between an acid solution supply source 46 of the acid solution, wherein the acid fill line 44 also includes an acid valve 48 for selectively admitting the acid solution from the supply source 46 into the acid holding tank 28. It is pointed out that the acid supply source 46 may simply be a temporary container utilized to fill or supplement the acid solution within the loop 26 at predetermined service intervals, and brought to the system 10 by service personnel, rather than a permanent container. The acid circulating loop 26 may also include an acid drain line 50 and acid drain valve 52, both being secured in fluid communication with the acid holding tank 28 and configured to selectively permit draining of the acid solution out of the acid holding tank 28.

In a preferred embodiment, the ammonia contact scrubber system 12 may also include sensor-signal means 54 secured in communication with the acid circulating loop 26 through a communication means 56 for sensing information about the acid solution, such as a degree of conversion of the acid solution described above in Equation 1. The sensing communication means may be a standard electrical transmission line, a radio-frequency communication device, or any method or mechanism capable of communicating sensed information from a solution to the sensor-signal means 54. The sensor-signal means 54 may be any mechanism capable of monitoring sensed information and communicating or signaling to a system operator or controller (not shown) whenever sensed information about the acid solution reaches a predetermined limit necessitating service of the ammonia contact scrubber system 12. For example, whenever 50 percent of the acid solution is converted from the acid to the ammonium dyhydrogen phosphate, the sensor-signal means could then be controlled to transmit a service signal the system 12 controller to replace or supplement the acid solution 30 through the acid fill line 44 and acid drain line 50. The sensor-signal means 54 may, for example, sense a level of ionic conductivity within the acid solution 30 to monitor a degree of conversion of the acid solution.

In another preferred embodiment of the present ammonia contact scrubber system 10, the acid circulating loop 26 is configured to direct flow of the liquid acid solution 30 through the support material 24 within the contact scrubber 12 in a first or downward direction between the scrubber acid inlet 36 and acid return 38 as represented by the directional arrow 58. The contact scrubber 12 is also configured to direct flow of the hydrogen rich fuel through the support material 24 in a second or upward direction between the scrubber fuel inlet 14 and the scrubber fuel exhaust 20, as represented by the directional arrow 60. For purposes herein the words "downward" and "upward" are to mean with respect to a direction of the force of gravity, wherein "downward" is about parallel to the direction of the force of gravity. The first direction 58 is opposed to the second direction 60 to achieve counter-flow of the acid solution 30 and fuel stream through the support material 24. In alternative embodiments, the contact scrubber 12 may be configured so that the first direction 58 of flow of the acid solution 60 through the support material 24 is simply different than the second direction 60 of flow of the fuel stream through the support material 24, for example to achieve cross-flow of the acid solution 30 and fuel stream, or any flow of the acid solution 30 and fuel stream that enhances removal of ammonia from the fuel stream.

The inventor herein has analyzed requirements for a known stationary phosphoric acid fuel cell power plant (not shown) that is commercially available from the owner of all rights in the present invention that have a power output of about 200 kilowatts and that include reformers to reform natural gas to produce a hydrogen rich fuel for the power plant. TABLE 1 shows data describing scrubber size and related requirements for such a power plant (not shown). TABLE 2 shows exemplary data for similar requirements for the 200 kilowatt fuel cell power plant using the ammonia scrubber system 10 of the present disclosure.

TABLE 1

| PPM Of Ammonia | Stoichiometric Grams Phosphoric Acid Required Per Hour | Grams Phosphoric Acid Required Per Hour With 50% Conversion | Pounds Phosphoric Acid Required Per 10 Years With 50% Conversion | Gallons Phosphoric Acid Required Per 10 Years With 50% Conversion | Cubic Feet Scrubber Volume With 10% Packing Efficiency For 10 Years |
|---|---|---|---|---|---|
| 0.5 | 0.24 | 0.49 | 94 | 7 | 8.9 |
| 1 | 0.49 | 0.98 | 188 | 13 | 17.8 |
| 1.5 | 0.73 | 1.46 | 283 | 20 | 26.6 |
| 2 | 0.98 | 1.95 | 377 | 27 | 35.5 |
| 5 | 2.44 | 4.88 | 942 | 66 | 88.8 |
| 10 | 4.88 | 9.76 | 1,884 | 133 | 177.6 |

TABLE 2

| PPM Of Ammonia | Stoichiometric Grams Phosphoric Acid Required Per Hour | Grams Phosphoric Acid Required Per Hour With 50% Conversion | Pounds Phosphoric Acid Required Per Year With 50% Conversion | Gallons Phosphoric Acid Required Per 10 Years With 50% Conversion | Cubic Feet Contact Scrubber + Acid Holding Tank For 1 Year |
|---|---|---|---|---|---|
| 0.5 | 0.24 | 0.49 | 9 | 0.7 | 1.8 |
| 1 | 0.49 | 0.98 | 19 | 1.3 | 3.6 |
| 1.5 | 0.73 | 1.46 | 28 | 2.0 | 5.3 |
| 2 | 0.98 | 1.95 | 38 | 2.7 | 7.1 |
| 5 | 2.44 | 4.88 | 94 | 6.6 | 17.8 |
| 10 | 4.88 | 9.76 | 188 | 13.3 | 35.5 |

As is apparent from review of the data in TABLE 1, a virtually worst case example of a fuel having as high an ammonia content as 10 parts per million ("PPM") would require 1,884 pounds of phosphoric acid, or about 133 gallons of phosphoric acid in a scrubber having an internal volume of about 177.6 cubic feet, with the support material therein having a packing efficiency of 10 percent, wherein the power plant is to run for 10 years in an uninterrupted mode and the acid is to remain at or below 50 percent conversion. (For purposes herein, the phrase "packing efficiency" is to mean a volume of acid divided by a total volume of the scrubber.) As can be understood, such large amounts of acid and large volume and cost of the scrubber make operation of such a fuel cell power plant with such a fuel virtually cost prohibitive.

In contrast, the data in TABLE 2 for such a fuel having 10 PPM of ammonia show a requirement of only 188 pounds or 13.3 gallons of phosphoric acid to stay at or below 50 percent conversion of the acid, where a predetermined service interval for the ammonia contact scrubber system 10 requires replacement of the phosphoric acid at one-year intervals. By the expedient of using the acid circulating loop 26, the system 10 provides for an efficient replacement of the relatively small amount of phosphoric acid at regular predetermined service intervals, thereby minimizing a size of the overall system 10. In essence, the 10 PPM of ammonia can be removed in 13 gallons of acid if a service interval of one year is used. It is anticipated that actual conversion of the acid in the described ammonia contact scrubber system 10 will be much higher than 50 percent because of a superior mass transfer before breakthrough of ammonia out of the scrubber 12 occurs. This will result in even less acid being required than the approximate 13 gallons described above.

Because the acid solution 30 is continually circulating through the support material 24 within the scrubber 12, the system 10 achieves enhanced contact between the acid solution and the hydrogen rich fuel through usage of any of a variety different support materials 24. For known scrubbers (not shown), as described above, the acid solution remains dispersed through interior pores and upon exterior surfaces of the support material. Therefore, a particular support material would have to have been selected based upon contaminant removal requirements and pressure drop limitations of the gaseous fuel passing through the support material. However, for the present ammonia contact scrubber system 10, because the acid solution continuously circulates over and through the support material 24, the system 10 provides for usage of a wide variety of support materials 24, such as the above described raschig rings, berl saddles or other advanced forms of these known devices that are designed to maximize a contact area between a liquid and a gas to maximize a rate of mass transfer. Therefore, an optimal level of ammonia removal may be achieved by the system 10 through use of a particular support material that has the least deleterious effects on the pressure of the fuel stream passing through the support material 24 within the scrubber 12.

When the ammonia contact scrubber system 10 is utilized with a fuel cell 16 that is a phosphoric acid fuel cell, temperatures of the hydrogen rich fuel stream entering and exiting the contact scrubber can be adjusted to be above or below operating temperatures of the fuel cell 16 to supplement acid within the fuel cell if necessary.

The present disclosure also includes a method of removing ammonia from a fuel stream for a fuel cell 16 using the ammonia contact scrubber system 10 by the steps of directing flow of a hydrogen rich fuel from the scrubber fuel inlet 14 of the contact scrubber 12, through the support material 24 within the scrubber 12, through the scrubber fuel exhaust 20, and into the fuel cell 16, and simultaneously directing flow of the liquid acid solution 30 from the scrubber acid inlet 36 of the contact scrubber 12 through the support material 24 within the scrubber 12 and through and out of the scrubber 12. The method may also include the step of servicing the ammonia contact scrubber system 12 at predetermined service intervals to replace or supplement the liquid acid solution 30, to thereby maintain the liquid acid solution 30 below a predetermined conversion rate according to Equation 1. For example, once per year of operation of the fuel cell 16 the ammonia contact scrubber system 12 may be serviced to have the liquid acid solution 30 replaced or supplemented to maintain the acid solution 30 at a conversion rate below 50 percent.

As is apparent, the ammonia contact scrubber system 12 provides a low cost and low volume system 12 for removing ammonia from a hydrogen rich fuel stream for a fuel cell 16. This will result in a broader fuel specification for the fuel cell 16, thereby permitting such fuel cells to be used in regions where the fuel contains high nitrogen contents. A life span of a fuel cell will thus be increased because performance decay associated with ammonia will have been virtually eliminated.

While the present disclosure has been presented above with respect to the described and illustrated ammonia contact scrubber system 10 for a fuel cell 16, it is to be understood the disclosure is not to be limited to those alternatives and described embodiments. For example, the system 10 may be utilized with any fuel cells including phosphoric acid fuel cells, proton exchange membrane fuel cells, etc. Accordingly, reference should be made primarily to the following claims rather than the forgoing description to determine the scope of the disclosure.

What is claimed is:

1. An ammonia contact scrubber system (10) for removing ammonia from a fuel stream for a fuel cell (16), the system (10) comprising:
   a. a contact scrubber (12) including a scrubber fuel inlet (14) configured to receive a hydrogen rich fuel for the fuel cell (16), a scrubber fuel exhaust (20) configured to direct flow of the hydrogen rich fuel from the scrubber (12) into the fuel cell (16), the contact scrubber (12) housing a support material (24) and configured to direct flow of the fuel from the scrubber fuel inlet (14) through the support material (24) to the scrubber fuel exhaust (20); and,
   b. an acid circulating loop (26) including an acid holding tank (28) configured to hold a liquid acid solution (30), an acid feed line (32) secured in fluid communication between an acid holding tank outlet (34) of the holding tank (28) and a scrubber acid inlet (36) of the contact scrubber (12), an acid return (38) secured in fluid communication between a scrubber acid outlet (40) of the contact scrubber (12) and the acid holding tank (28), and an acid circulation means (42) secured in fluid communication with the acid feed line (32) and configured to pump the acid solution (30) through the acid circulating loop (32).

2. The ammonia contact scrubber system (10) of claim 1 wherein the acid circulating loop (26) is configured to direct flow of the liquid acid solution (30) through the contact scrubber (12) in a downward direction (58) between the scrubber acid inlet (36) and scrubber acid outlet (40), the contact scrubber (12) is configured to direct flow of the hydrogen rich fuel in an upward direction (60) between the scrubber fuel inlet (14) and the scrubber fuel exhaust (20), and wherein the downward direction (58) is opposed to the upward direction (60).

3. The ammonia contact scrubber system (10) of claim 1 wherein the acid circulating loop (26) is configured to direct flow of the liquid acid solution (30) through the contact scrubber (12) in a downward direction about (58) parallel to a direction of a force of gravity between the scrubber acid inlet (36) and scrubber acid outlet (40), and the contact scrubber (12) is configured to direct flow of the hydrogen rich fuel in the downward direction (58) between the scrubber fuel inlet (14) and the scrubber fuel exhaust (20).

4. The ammonia contact scrubber system (10) of claim 1, further comprising a sensor-signal means (54) secured in communication with the acid circulating loop (26) through a communication means (56) for sensing information about the acid solution (30).

5. The ammonia contact scrubber system (10) of claim 1, wherein the liquid acid solution comprises a phosphoric acid solution and the support material (24) within the contact scrubber (12) are selected from the group consisting of raschig rings resistant to corrosion by phosphoric acid and berl saddles resistant to corrosion by phosphoric acid.

6. A method of removing ammonia from a hydrogen rich fuel stream for a fuel cell (16), comprising the steps of:
 a. directing flow of a hydrogen rich fuel from a fuel source (18) through a scrubber fuel inlet (14) of a contact scrubber (12), through a support material (24) within the scrubber (12), through a scrubber fuel exhaust (20), and into the fuel cell (16); and,
 b. simultaneously circulating flow of a liquid acid solution (30) from a scrubber acid inlet (36) of the contact scrubber (12) through the support material (24) within the scrubber (12) and out of the scrubber (12).

7. The method of claim 6, further comprising the step of circulating flow of the liquid acid solution (30) from the contact scrubber (12) to an acid holding tank (28) and back to the scrubber (12), and replacing or supplementing with additional liquid acid solution (30) the liquid acid solution (30) within the acid holding tank (28) at predetermined service intervals to thereby maintain the liquid acid solution (30) below a predetermined degree of conversion according to Equation 1.

8. The method of claim 7, further comprising the step of, prior to the step of replacing or supplementing with additional liquid acid solution, sensing the conversion rate according to Equation 1 within the contact scrubber (12), and then transmitting a service signal responsive to the liquid acid solution reaching a predetermined conversion limit.

9. The method of claim 6, further comprising the step of directing flow of the liquid acid solution (30) through the contact scrubber (12) in a downward direction (58) about parallel to a direction of a force of gravity between the scrubber acid inlet (36) and scrubber acid outlet (40), and directing flow of the hydrogen rich fuel in an upward direction (60) between the scrubber fuel inlet (14) and the scrubber fuel exhaust (20), and wherein the downward direction (58) is opposed to the upward direction (60).

* * * * *